United States Patent [19]
Hirasawa

[11] Patent Number: 5,953,646
[45] Date of Patent: *Sep. 14, 1999

[54] SYSTEM FOR CONTROLLING POWER CONSUMPTION OF A MOBILE RADIO COMMUNICATION DEVICE DURING STANDBY USING SIGNAL ERROR RATE

[75] Inventor: Naoki Hirasawa, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/497,252

[22] Filed: Jun. 30, 1995

[30] Foreign Application Priority Data

Jun. 30, 1994 [JP] Japan .................................... 6-171724

[51] Int. Cl.$^6$ ...................................................... H04Q 7/32
[52] U.S. Cl. .......................... 455/343; 455/38.3; 455/574
[58] Field of Search .................................. 455/343, 38.3, 455/38.1, 127, 126, 245.1, 245.2, 234.1, 556, 572, 574, 575, 226.1; 340/825.44; 371/5.5

[56] References Cited

U.S. PATENT DOCUMENTS

| | | | |
|---|---|---|---|
| 5,001,776 | 3/1991 | Clark | 455/234.1 X |
| 5,265,270 | 11/1993 | Stengel et al. | 455/343 |
| 5,276,685 | 1/1994 | Kepler et al. | 455/234.1 X |
| 5,392,023 | 2/1995 | D'Avello et al. | 455/343 X |
| 5,471,655 | 11/1995 | Kivari | 455/343 X |
| 5,604,924 | 2/1997 | Yokoya | 455/126 X |
| 5,778,309 | 7/1998 | Tuttle et al. | 455/38.3 |

FOREIGN PATENT DOCUMENTS

| | | |
|---|---|---|
| 57-33846 | 2/1982 | Japan. |
| 63-13525 | 1/1988 | Japan. |
| 2250402 | 6/1992 | United Kingdom. |
| 2261140 | 5/1993 | United Kingdom. |

Primary Examiner—Wellington Chin
Assistant Examiner—Philip J. Sobutka
Attorney, Agent, or Firm—Sughrue, Mion, Zinn, Macpeak & Seas, PLLC

[57] ABSTRACT

A mobile radio communication system that enables to reduce its power consumption during a standby time without reception performance deterioration. The system contains a radio receiver for receiving a radio wave Witted from a base station to produce an input signal, and a supply power controller for controlling a supply power supplied to the radio receiver. An error detector detects an error generated in the control signal. A supply power controller controls to reduce a supply power to the radio receiver during a standby time according to appearance of errancy of the control signal. The error detector preferably detects to calculate an error rate of the control signal, and the supply power controller controls to change the supply power according to the result of comparison. The system may further contains a resetter for stopping the supply power reduction action of the supply power controller. The resetter is driven at call signal reception and transmission.

11 Claims, 3 Drawing Sheets

SYSTEM FOR CONTROLLING POWER CONSUMPTION OF A MOBILE RADIO COMMUNICATION DEVICE DURING STANDBY USING SIGNAL ERROR RATE

BACKGROUND OF THE INVENTION

1. Field of the Invention

The present invention relates to a radio communication system and more particularly, to a mobile radio communication system that enables to reduce power consumption during a standby time for waiting a call from a base radio station without reception performance deterioration.

2. Description of the Prior Art

Conventionally, to reduce power consumption of a mobile radio communication system during a standby time, it has been well known that a radio receiver block of the system is controlled to be active intermittently, reducing the effective consumption power. With this method, for example, a control block of the system feeds a signal into a power-supply controller circuit of the system at specified intervals so that the receiver block becomes active or inactive in response to the signal.

With this conventional method, however, some control protocol is required in advance to communicate between the system and any base station. If the system operates without the protocol, there is a possibility that it fails to receive necessary signals from the base station.

To solve this problem, other methods have been developed under the estimate or expectation that slight sensitivity reduction of the radio receiver does not cause any problem. An example of the methods is disclosed in the Japanese Non-Examined Patent Publication No. 57-33846 (published in February 1982), in which the sensitivity of the radio receiver block is reduced during a standby time and is returned to the original or normal value at the time of reception of a calling signal, resulting in reduction of power consumption.

During the standby time, a radio wave intercepted by an antenna is supplied to a radio receiver circuit through a radio-frequency (RF) attenuator. An input level of the receiver circuit is reduced by the attenuator. Consequently, only a strong radio wave transmitted from a specific area is detected and the other weak radio waves having the same frequency as the strong radio wave are not detected. A detector circuit detects the output of the receiver circuit and judges whether the demodulated output contains a call signal for the radio receiver or not.

When the call signal is received, the radio wave intercepted by the antenna is supplied to the radio receiver circuit without passing through the attenuator, maximizing the sensitivity of the receiver circuit. The demodulated output of the receiver circuit is supplied to an audio-freqency (AF) amplifier. Thus, the amplified output of the AF amplifier drives a speaker.

Another example of the methods is disclosed in the Japanese Non-Examined Patent Publication No. 63-13525 (published in January, 1988), in which a supply current to a receiver block is reduced under the condition that the receiver block has a sensitivity suafficient to detect a wanted RF signal, resulting in reduction of power consumption.

A RF signal intercepted by an antenna is supplied to a radio receiver block through a duplexer. The receiver block contains a RF amplifier, a frequency converter, an intermediate-frequency (IF) amplifier, and an AF amplifier. The AF amplifier has a demodulator and a noise or electric-field sqelch circuit.

A part of the output of the receiver block, which changes dependent on whether any RF signal is contained therein, is supplied to a main controller. As a part of the output, an output of the noise or electric-field squelch circuit is used typically. Another pert thereof, which is a voice signal containing a call signal or the like, is supplied to a current controller for controlling a supply current to the receiver block. The main controller controls a radio transmitter block. The main controller controls the receiver block also through the current controller.

The transmitter block supplies a RF output signal to the antenna through the duplexer under the control of the main controller.

A power supply, which is typically made by a dry or storage battery or batteries, supplies a power to the main controller, the transmitter block and the current controller.

Since no RF signal is supplied to the receiver block during a standby time, the current controller reduces the supply current to the receiver block under the condition that the receiver block has a sensitivity sufficient to be able to detect a wanted RF signal to drive the squelch circuit.

Even if the supply current to the receiver block is reduced, the sensitivity of the receiver block does not tend to decrease so much. This means that such the supply current reduction of the block causes no problem for detecting the wanted RF signal.

When any wanted RF signal is intercepted by the antena, the receiver block sends a signal to the current controller, so that the controller increases the supply current to the receiver block in response to this signal. Thus, the receiver block stares its normal operation.

For the above conventional methods in which power consumption reduction is realized by the sensitivity reduction of the radio receiver during the standby time, it is important to know the level to which the sensitivity can be lowered. This level is not disclosed clearly nor specifically in the method of the Japanese Non-Examined Patent Publication No. 57-33846.

In the method of the Japanese Non-Examined Patent Publication No. 63-13525 also, this sensitivity level is not shown clearly nor specifically. In view of this, the power consumption reduction is obliged to be performed without precise estimate of the sensitivity level. As a result, there arises a possibility that any RF signal transmitted from a base station fails to be received due to power consumption reduction. Alternatively, the sensitivity reduction is restrained because the reception of the RF signal is regarded as important, resulting in insufficient or no power consumption reduction.

Further, if the power consumption reduction is excessively progressed according to the above conventional methods, there arises a danger that the performance of the communication system deteriorates instead, degrading the marketability of the system.

SUMMARY OF THE INVENTION

Accordingly, an object of the present invention is to provide a mobile radio communication system that enahles to reduce its power consumption during a standby time for waiting a call from a base radio station without reception performance deterioration.

A mobile radio communication system according to the present invention contains a radio receiver for receiving a radio wave tranmitted from a base station to produce an input signal, and a supply power controller for controlling a supply power supplied to the radio receiver.

An error detector is provided for detecting an error in a control signal containing an input signal.

A supply power controller is further provided for controlling to reduce a supply power to the radio receiver during a standby time according to appearance of errancy of the control signal.

The error detector preferably detects to calculate an error rate of the control signal, and the supply power controller controls to change the supply power according to the result of comparison.

The system may further comprising a resetter for stopping supply power reduction action of the supply power controller. The resetter is driven at reception of a call signal and at transmission.

With the mobile communication system according to the invention, the supply current to the radio receiver block is reduced or limited according to appearance of errancy of the received control signal. For this reason, the supply power can be controlled objectively and automatically corresponding to the actual reception state of the receiver block As a result, the supply power can be reduced as much as possible under the condition that the radio wave from the base station is ensured to be received, providing the satisfactory effect or advantage of the power consumption reduction without reception performance deterioration.

In addition, if the resetter is provided in the supply power controller to stop the supply current reduction by a reset signal, the native power can be supplied to the receiver block promptly at the call signal reception and the radio signal transmission.

DESCRIPTION OF THE PREFERRED EMBODIMENTS

Figure 1:
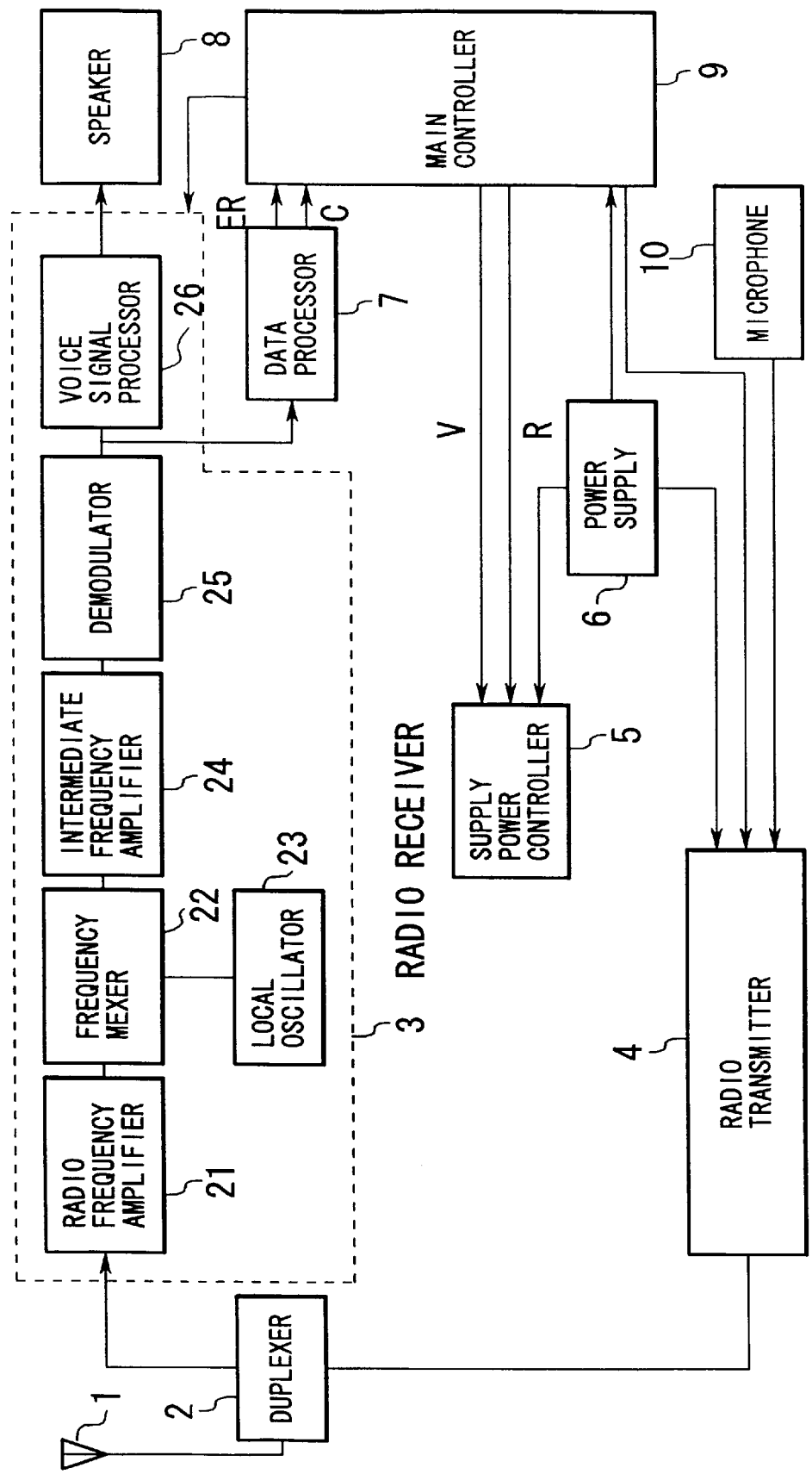
FIG. 1 is a schematic, functional block diagram of a mobile radio communication system according to a first embodiment of the present invention.

Preferred embodiments of the present invention will be described below while referring to the drawings attached.

FIRST EMBODIMENT

As shown in FIG. 1, a mobile radio communication system according to a first embodiment of the invention contains an antenna 1, a duplexer 2, a radio receiver block 3, a radio transmitter block 4, a supply power controller 5, a power supply 6, a data processor 7, a speaker 8, a main controller 9 and a microphone 10.

The antenna 1 intercepts a radio wave containing a coded control signal and/or a voice signal resulting in an RF input signal.

The duplexer 2 is used for duplexing the antenna 1 for transmission and reception.

The radio receiver block 3 receives the RF input signal and reproduces the voice signal contained therein through the speaker 8. Also, the receiver block 3 sends the coded control signal contained in the input signal to the data processor 7 provided outside the receiver block 3.

The radio transmitter block 4 RF-amplifies, frequency-converts and power-amplifies a voice signal produced by the microphone 10 and then, transmits the amplified voice signal to the atmosphere through the duplexer 2 and antenna 1.

The power supply 6, which is typically made of a dry or storage battery or batteries, supplies an electric power to the radio receiver block 3 through the supply power controller 5. The power supply 6 feeds respective electric power to the main controller 0 and the radio transmitter block 4, also.

The supply power controller 5 controls the supply power to the radio receiver block 3 according to the result of the error detection for the coded control signal.

The data processor 7 receives the coded control signal from the demodulator 25 and then, performs coherent detection for this control signal, resulting in the control data. The control data (C) is inputted into the main controller 9.

The data processor 7 further performs error detection for the control data (C) and supplies the result (ER) of detection to the main controller 9.

The main controller 9 controls the radio receiver block 3 and the radio transmitter block 4 according to the control signal. The controller 9 controls the supply power controller 5 also according to the result of the error detection.

Figure 2:
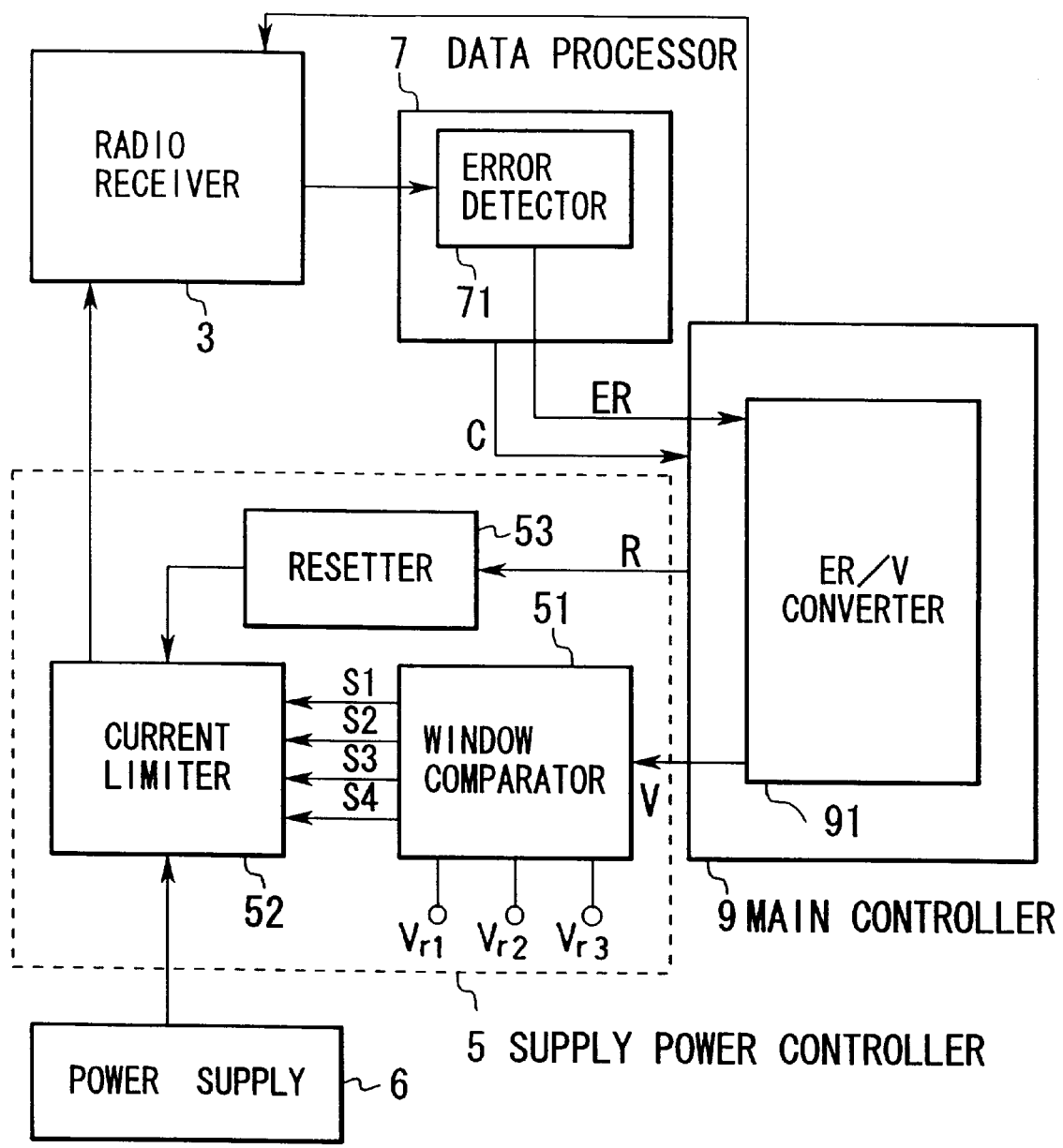
FIG. 2 is a schematic, functional block diagram showing the power supply controller and its vicinity of the system of FIG. 1

The control of the supply power controller 5 is carried out in the following way:

As shown in FIG. 2, the supply power controller 5 includes a window comparator 51, a current limiter 52 and a resetter 53.

The data processor 7 has an error detector 71. This error detector 71 receives the coded control signal from the demodulator 25, detects any error therein, and sends the result of the error detection, i.e., an error rate signal (ER), to the main controller 9.

The main controller 9 has an error-rate/voltage (ER/V) converter 91. This (ER/V) converter 91 converts the error rate signal (ER) of the received control data to a voltage signal (V). The voltage signal (V) is inputted to the window comparator 51 of the supply power controller 5.

The window comparator 51 compares the inputted voltage signal (V) with three reference voltages $V_{r1}$, $V_{r2}$ and $V_{r3}$ and outputs the result of the comparison.

The current limiter 52 decreases or limits in steps the supply current to the radio receiver 3 according to the result of the comparison.

The resetter 53 receives a reset signal (R) from the main controller 9 to stop the current decrease or limit action of the current limiter 52, providing the original or essential supply current to the radio receiver block 3.

Next, the operation of the mobile communication system according to the first embodiment will stated below.

During standby and talking times, a radio wave transmitted from a base radio station is intercepted by the antenna 1 and a resultant RF input signal is fed through the duplexer 2 to the RF amplifier 21 in the radio receiver block 3. The RF input signal is amplified by the RF amplifier 21, frequency-mixed by the mixer 22 with a local signal produced by the local oscillator 73, IF-amplified by the IF amplifier 24, and demodulated by the demodulator 25, sequentially.

During the standby time, since the radio wave contains only the coded control signal, no voice signal is derived from the demodulated input signal from the demodulator 25, producing no voice or sound at the speaker 8.

The data processor 7 receives to process the demodulated input signal, deriving the coded control data (C) therefrom. The control data (C) is sent to the main controller 9 to be used for controlling the mobile communication system itself.

The error detector 71 of the data processor 7 also receives the demodulated input signal to detect possible errors that will be found in the coded control data (C). The error detector 71 then calculates the error rate of the data (C) based on the detection result, and outputs the error-rate signal (ER) to the (ER/V) converter 91 in the main controller 9.

The (ER/V) converter 91 converts the error rate signal (ER) to a voltage signal (V) that changes dependent upon the error rate value ER. The voltage signal (V) thus produced is inputted to the window comparator 51 of the supply power controller 5.

In the window comparator 51, the inputted voltage value V is compared with three reference voltage values $V_{r1}$, $V_{r2}$ and $V_{r3}$ where $V_{r1} < V_{r2} < V_{r3}$. Four states or levels of the reception performance are therefore defined corresponding to four cases of (1) $V > V_{r3}$, (2) $V_{r2} < V \leq V_{r3}$, (3) $V_{r1} < V \leq V_{r2}$, and (4) $V \leq V_{r1}$. The comparator 51 outputs four current limiting signals S4, S3, S2 and S1 that correspond to the cases of $V > V_{r3}$, $V_{r2} < V \leq V_{r3}$, $V_{r1} < V \leq V_{r2}$, and $V \leq V_{r1}$, respectively, as the result of the comparison.

The current limiter 52 alternately provides the supply current having four current values $I_4$, $I_3$, $I_2$ and $I_1$ corresponding to the reception states of $V > V_{r3}$, $V_{r2} < V \leq V_{r3}$, $V_{r1} < V \leq V_{r2}$, and $V \leq V_{r1}$, where $I_4 > I_3 > I_2 > I_1$.

Therefore, in the case of $V \leq V_{r1}$, the error rate value ER is extremely low, that is, the reception state of the communication system is very good. Therefore, the supply current is set as the lowest value $I_1$, enabling to reduce most effectively the power consumption of the radio receiver block 3.

If the value ER increases slightly due to decrease in radio wave strength, increase in noise or the like, the supply current is set as the value $I_2$ greater than $I_1$. Thus, reception performance of the system is improved so that the radio wave from the base station is ensured to be received. The current value $I_2$ is held under the condition that $V_{r1} < V \leq V_{r2}$ is maintained.

When $V_{r1} < V \leq V_{r2}$ is not maintained in spite of the current value $I_2$, the reception performance is not sufficient and therefore, the supply current is further increased to the value $I_3$ greater than $I_2$.

Similarly, the current value $I_3$ is held under the condition that $V_{r2} < V \leq V_{r3}$ is maintained. When $V_{r2} < V \leq V_{r3}$ is not maintained, i.e., $V > V_{r3}$ is established, in spite of the current value $I_3$, the reception performance is not yet sufficient and therefore, the supply current is further increased to the value $I_4$ greater than $I_3$ to ensure the good reception of the radio wave. The value $I_4$ is equal to the original current value necessary for the normal communication operation, resulting in no power consumption reduction in the radio receiver block 3.

The following is a concrete example, in which the error rate value ER and the voltage signal value V satisfy the following relationships, and the reference voltages $V_{r1}$, $V_{r2}$ and $V_{r3}$ are set as 0.5 volts, 1.5 volts and 2.5 volts, respectively.

| | |
|---|---|
| 50% ≤ ER | V = 5.0 volts |
| 10% ≤ ER < 50% | V = 4.5 volts |
| 5% ≤ ER < 10% | V = 4.0 volts |
| 1% ≤ ER < 5% | V = 3.5 volts |
| 0.5% ≤ ER < 1% | V = 3.0 volts |
| 0.1% ≤ ER < 0.5% | V = Vr3 = 2.5 volts |
| 0.05% ≤ ER < 0.1% | V = 2.0 volts |
| 0.01% ≤ ER < 0.05% | V = Vr2 = 1.5 volts |
| 0.005% ≤ ER < 0.01% | V = 1.0 volts |
| 0.001% ≤ ER < 0.005% | V = Vr1 = 0.5 volts |
| ER ≤ 0.001% | V = 0 volts |

Therefore, the supply current value to the radio receiver block 3 is set as follows corresponding to the error rate value ER:

| | |
|---|---|
| ER < 0.005% | $I_1$ |
| 0.005% ≤ ER < 0.05% | $I_2$ |
| 0.05% ≤ ER < 0.5% | $I_3$ |
| 0.5% ≤ ER | $I_4$ |

If a call signal from a base station is received by the radio receiver block 3 during the standby time under the consumption power reduction, a reset signal (R) is sent from the main controller 9 to the resetter 53. In response to the signal (R), the resetter 53 stops the current decrease or limit action by the current limiter 52, providing the original or essential supply current $I_4$ to the radio receiver block 3 in order to ensure the native reception performance of the receiver, block 3.

In the case of transmission, the main controller 9 sends a reset signal (R) to the resetter 53 by the operation of the user. Thus, the original or essential supply current 14 is fed to the radio receiver block 3 in the same way as above. Then, a voice signal, which is produced by the microphone 10, is subjected to AF-amplification, frequency-conversion, and power-amplification in the radio transmitter block 4 and is irradiated through the duplexer 2 and the antenna 1 to the atmosphere as a radio wave.

As described above, with the mobile communication system of the first embodiment, the supply current to the radio receiver block 3 is reduced or limited according to appearance of errancy of the control data, i.e., the error rate value ER. For this reason, the supply current can be controlled objectively and automatically corresponding to the actual reception state of the receiver block 3.

As a result, the supply current can be reduced as much as possible under the condition that the radio wave from the base station is ensured to be received, providing the satisfactory effect or advantage of the power consumption reduction without reception performance deterioration.

In addition, since the resetter 53 is provided in the supply power controller 5 to stop the supply current reduction by the reset signal (R), the native current or power can be supplied to the receiver block 3 promptly at the call signal reception and at the radio signal transmission.

Although the reception state is divided into four steps or levels in the first embodiment, it may be divided into any number of steps.

SECOND EMBODIMENT

Figure 3:
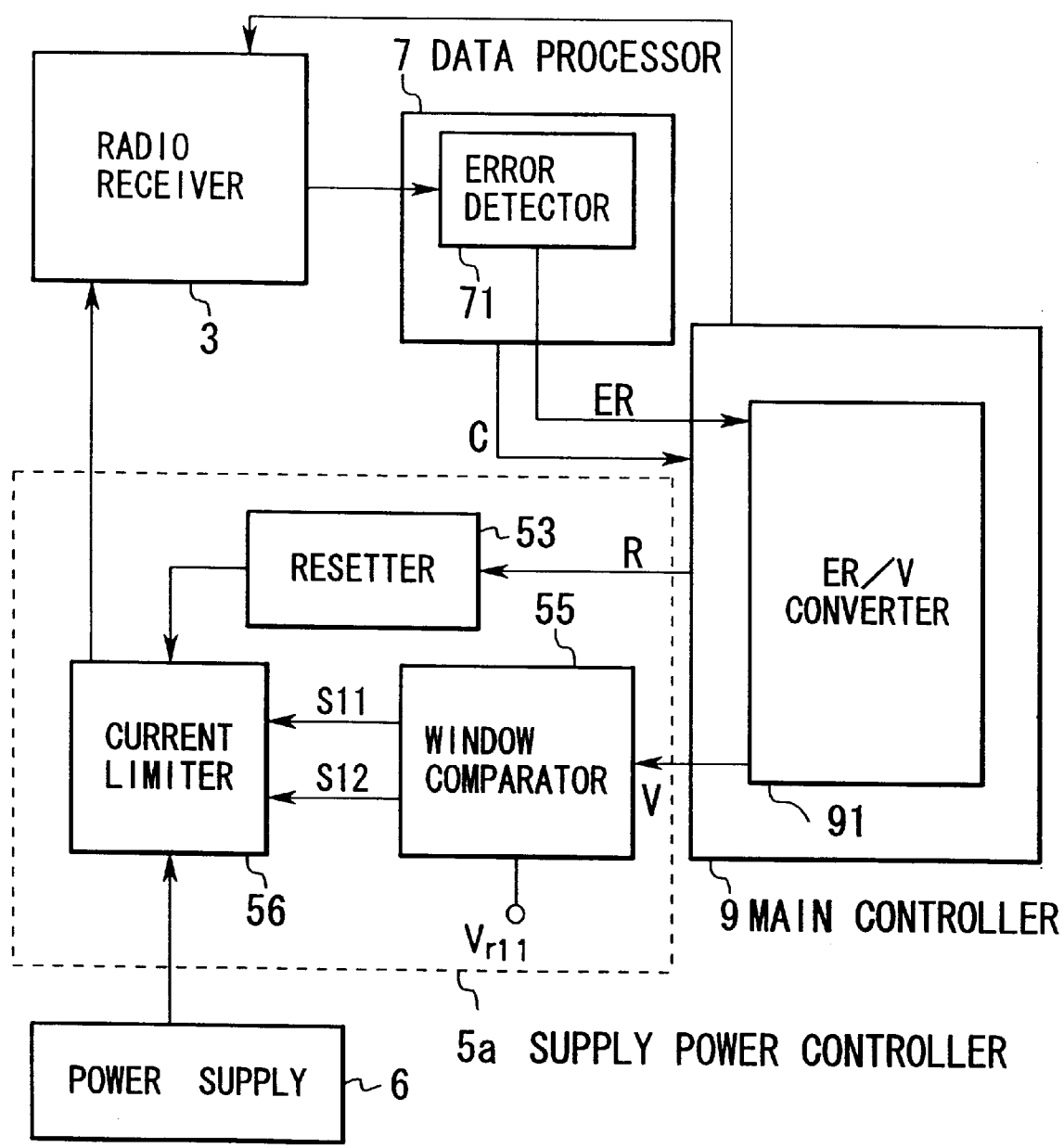
FIG. 3 is a schematic, functional block diagram showing the power supply controller and its vicinity of a mobile radio communication system according to a second embodiment of the invention.

FIG. 3 shows a supply power controller of a mobile radio communication system and its vicinity according to a second embodiment of the invention.

As shown in FIG. 3, this system has the same configuration as that of the first embodiment other than that a supply power controller 5a.

The supply power controller 5a includes a window comparator 55 that compares the inputted voltage signal value V with one reference voltage value $V_{r11}$ (=2.5 volt, for example) and outputs the result of the comparison and a current limiter 56 that limits the supply current to the radio receiver block 3 according to the comparison result.

In the window comparator 55, the inputted voltage value V is compared with the single reference voltage value $V_{r11}$, and two states or levels of the reception performance are therefore defined corresponding to two cases of (1) $V > V_{r11}$ and (2) $V \leq V_{r11}$. The comparator 55 outputs two current limiting signals S12 and S11 that correspond to the cases of $V > V_{r11}$ and $V \leq V_{r11}$, respectively, as the result of the comparison.

The current limiter 56 alternately provides the supply current having two current values $I_{12}$ and $I_{11}$ corresponding to the reception states or levels of $V > V_{r11}$ and $V \leq V_{r11}$, where $I_{12} > I_{11}$.

In the case of $V > V_{r11}$ the signal S2 is inputted into the current limiter 56 so that the supply current is increased continuously or incrementally until the signal S1 is inputted thereinto due to the decrease of the error rate value ER.

Similarly, in the case of $V \leq V_{r11}$, the signal S1 is inputted into the current limiter 56 so that the supply current is decreased continuously or incrementally until the signal S2 is inputted thereinto due to the increase of the error rate value ER.

Thus, the supply current is designed to be kept automatically at a value corresponding to the reference voltage value $V_{r11}$.

The system of the second embodiment can provide the same effect or advantage since it is substantially the same in configuration as that of the first embodiment.

While the preferred forms of the present invention have been described, it is to be understood that modifications will be apparent to those skilled in the art without departing from the spirit of the invention. The scope of the invention, therefore, is to be determined solely by the following claims.

What is claimed is:

1. A mobile radio communication system, comprising:
   a radio receiver for receiving a radio wave transmitted from a base station to produce an input signal;
   a supply power controller for controlling a supply power supplied to said radio receiver; and
   an error detector for detecting an error rate of a control signal derived from said input signal,
   wherein, during a standby time, said supply power controller sets the supply power at a first level when the error rate of the control signal is less than a first threshold, said supply power controller sets the supply power at a second level when the error rate of the control signal is between the first threshold and a second threshold, and said supply power controller sets the supply power at a third level when the error rate of the control signal is greater than the second threshold.

2. The system as claimed in claim 1, further comprising a resetter which sends a reset signal to said supply power controller when a call signal is received, said supply power controller supplying full power upon reception of the reset signal.

3. A mobile radio communication system, comprising:
   a radio receiver for receiving a radio wave transmitted from a base station to produce an input signal;
   a supply power controller for controlling a supply power to said radio receiver;
   an error detector for detecting errors in a control signal derived from said input signal and for calculating an error rate of said control signal;
   a converter for converting said error rate to an electric signal; and
   a comparator for comparing said electric signal with at least one reference;
   said supply power controller varying a supply power to said radio receiver among at least three predetermined levels during a standby time according to the result of comparison,
   wherein said comparator compares said electric signal corresponding to said error rate with a plurality of references to define a plurality of error levels according to the result of comparison, and wherein said supply power controller supplies different and constant powers to said radio receiver corresponding to said plurality of error levels.

4. The system as claimed in claim 3, wherein said supply power is changed in steps dependent upon said result of comparison.

5. The system as claimed in claim 4, further comprising a resetter which sends a reset signal to said supply power controller when a call signal is received, said supply power controller supplying full power upon reception of the reset signal.

6. A mobile radio communication system, comprising:
   an antenna for intercepting a radio wave transmitted from a base station to produce an input signal;
   a radio receiver for receiving said input signal to reproduce a transmitted voice signal;
   a data processor for processing a control signal derived from said input signal to obtain control data;
   a radio transmitter for transmitting an output voice signal through said antenna;
   a supply power controller for controlling a supply power to said radio receiver;
   an error detector for detecting an error rate of said control signal;
   a converter for converting said error rate to an electric signal;
   a comparator for comparing said electric signal with at least one reference;
   a limiter for limiting said supply power to said radio receiver according to the result of comparison in said comparator;
   a main controller for controlling said radio receiver, said radio transmitter, and said supply power controller, said main controller being controlled by using said control data, wherein said supply power controller varies said supply power to said radio receiver among at least three predetermined levels during a standby time in accordance with the error rate of said control signal and said comparator compares said electric signal corresponding to said error rate with a plurality of references to define a plurality of error levels according to the result of comparison, and wherein said supply power controller supplies different and constant powers to said radio receiver corresponding to said plurality of error levels.

7. The system as claimed in claim 6, further comprising a resetter which sends a reset signal to said supply power controller when a call signal is received, said supply power controller supplying full power upon reception of the reset signal.

8. A mobile radio communication system, comprising:

a radio receiver for receiving a radio wave transmitted from a base station to produce an input signal;

a supply power controller for controlling a supply power supplied to said radio receiver;

an error detector for detecting an error rate of a control signal derived from said input signal; and a comparator for comparing an electric signal corresponding to the error rate to a reference corresponding to a desired standby-time control signal error rate;

wherein, during a standby time, when the electric signal is greater than the reference, said supply power controller increases the supply power to said radio receiver until the electric signal is not greater than the reference in order to cause the error rate to decrease toward the desired standby-time control signal error rate, and, when the electric signal is less than the reference, said supply power controller decreases the supply power to said radio receiver until the electric signal is not less than the reference to cause the error rate to increase toward the desired standby-time control signal error rate.

9. The system as claimed in claim 8, further comprising a resetter which sends a reset signal to said supply power controller when a call signal is received, said supply power controller supplying full power upon reception of the reset signal.

10. The system as claimed in claim 8, wherein said supply power controller continuously increases the supply power to said radio receiver when the electric signal is greater than the reference and continuously decreases the supply power to said radio receiver when the electric signal is less than the reference.

11. The system as claimed in claim 8, wherein said supply power controller incrementally increases the supply power to said radio receiver when the electric signal is greater than the reference and incrementally decreases the supply power to said radio receiver when the electric signal is less than the reference.

* * * * *